(12) United States Patent
Um

(10) Patent No.: US 9,961,229 B2
(45) Date of Patent: May 1, 2018

(54) IMAGE FORMING APPARATUS SUPPORTING NEAR-FIELD COMMUNICATION (NFC) FUNCTION, AND METHOD OF PREVIEWING SCAN DATA OF IMAGE FORMING APPARATUS ON MOBILE TERMINAL

(71) Applicant: S-Printing Solution Co., Ltd., Suwon-si, Gyeonggi-do (KR)

(72) Inventor: Se-yong Um, Seoul (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days. days.

(21) Appl. No.: 14/676,209

(22) Filed: Apr. 1, 2015

(65) Prior Publication Data
US 2016/0065781 A1 Mar. 3, 2016

(30) Foreign Application Priority Data
Sep. 2, 2014 (KR) .......... 10-2014-0116375

(51) Int. Cl.
*H04N 1/00* (2006.01)
*H04N 1/32* (2006.01)
*H04W 4/00* (2018.01)
*H04N 1/21* (2006.01)

(52) U.S. Cl.
CPC ....... *H04N 1/32106* (2013.01); *H04N 1/0044* (2013.01); *H04N 1/00204* (2013.01); *H04N 1/00244* (2013.01); *H04N 1/00307* (2013.01); *H04N 1/00493* (2013.01); *H04N 1/21* (2013.01); *H04W 4/008* (2013.01); *H04W 4/80* (2018.02); *H04N 2201/0081* (2013.01); *H04N 2201/0094* (2013.01)

(58) Field of Classification Search
CPC .......... H04N 1/32106; H04N 1/00307; H04N 1/00244; H04N 1/0044; H04N 1/00493; H04N 1/00204; H04N 1/21; H04N 2201/0094; H04N 2201/0081; H04W 4/008
USPC ...................... 358/1.13, 1.15, 1.16
See application file for complete search history.

(56) References Cited

U.S. PATENT DOCUMENTS

| | | | | |
|---|---|---|---|---|
| 2013/0054519 A1* | 2/2013 | Ohno | ............... | H04L 67/2823 707/610 |
| 2013/0250354 A1* | 9/2013 | Kato | ............... | H04N 1/00299 358/1.15 |
| 2014/0160512 A1* | 6/2014 | Mori | ............... | H04N 1/00838 358/1.14 |
| 2015/0116762 A1* | 4/2015 | Sato | ............... | H04N 1/00103 358/1.15 |

FOREIGN PATENT DOCUMENTS

JP 2001-45197 2/2001

* cited by examiner

Primary Examiner — Kent Yip
(74) Attorney, Agent, or Firm — Jefferson IP Law, LLP

(57) ABSTRACT

An image forming apparatus supporting a near-field communication (NFC) function generates scan data by scanning a document, transmits the scan data to a server, receives access information for accessing a preview image of the scan data stored in the server, tags a mobile terminal on which the preview image is to be displayed through NFC, and transmits the access information to the tagged mobile terminal.

21 Claims, 16 Drawing Sheets

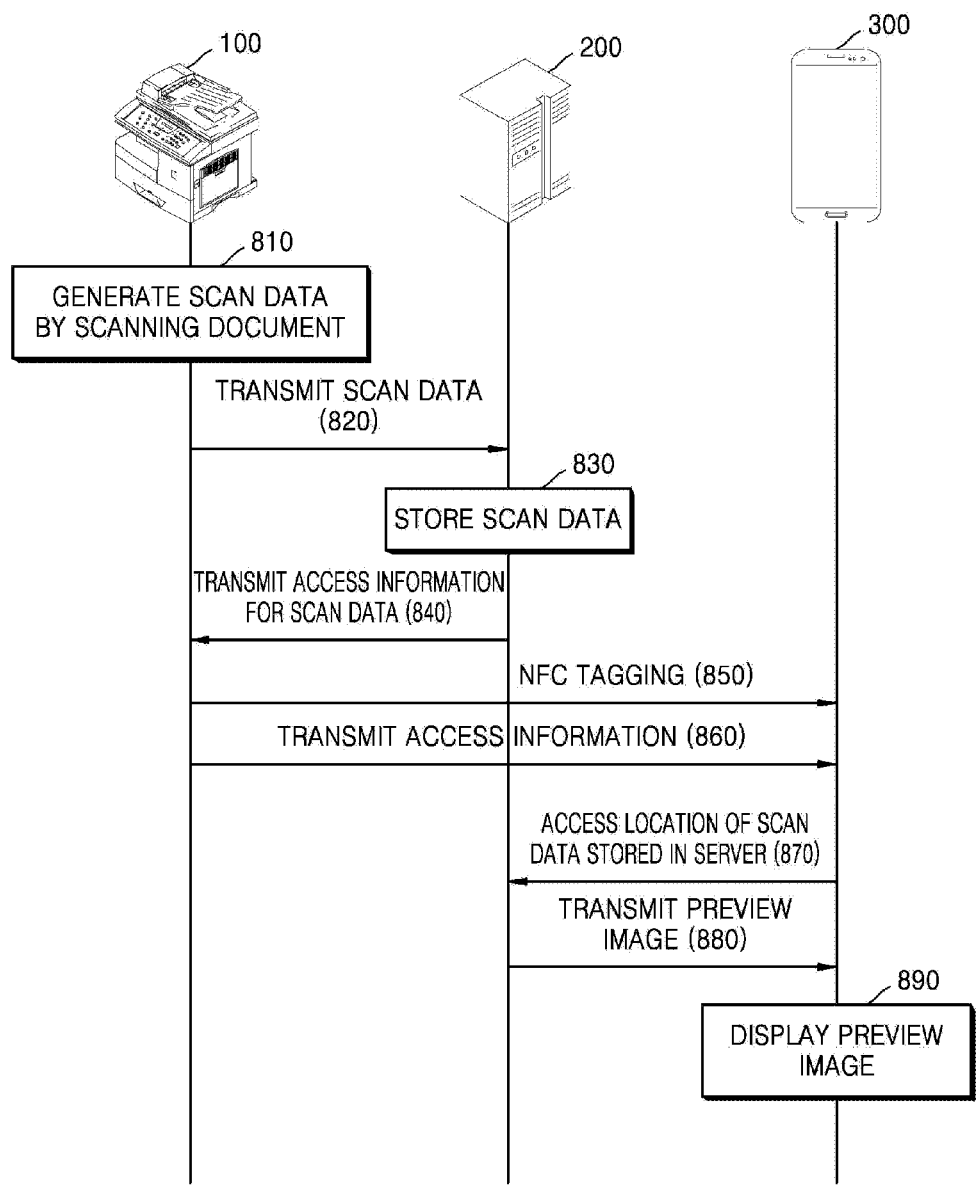

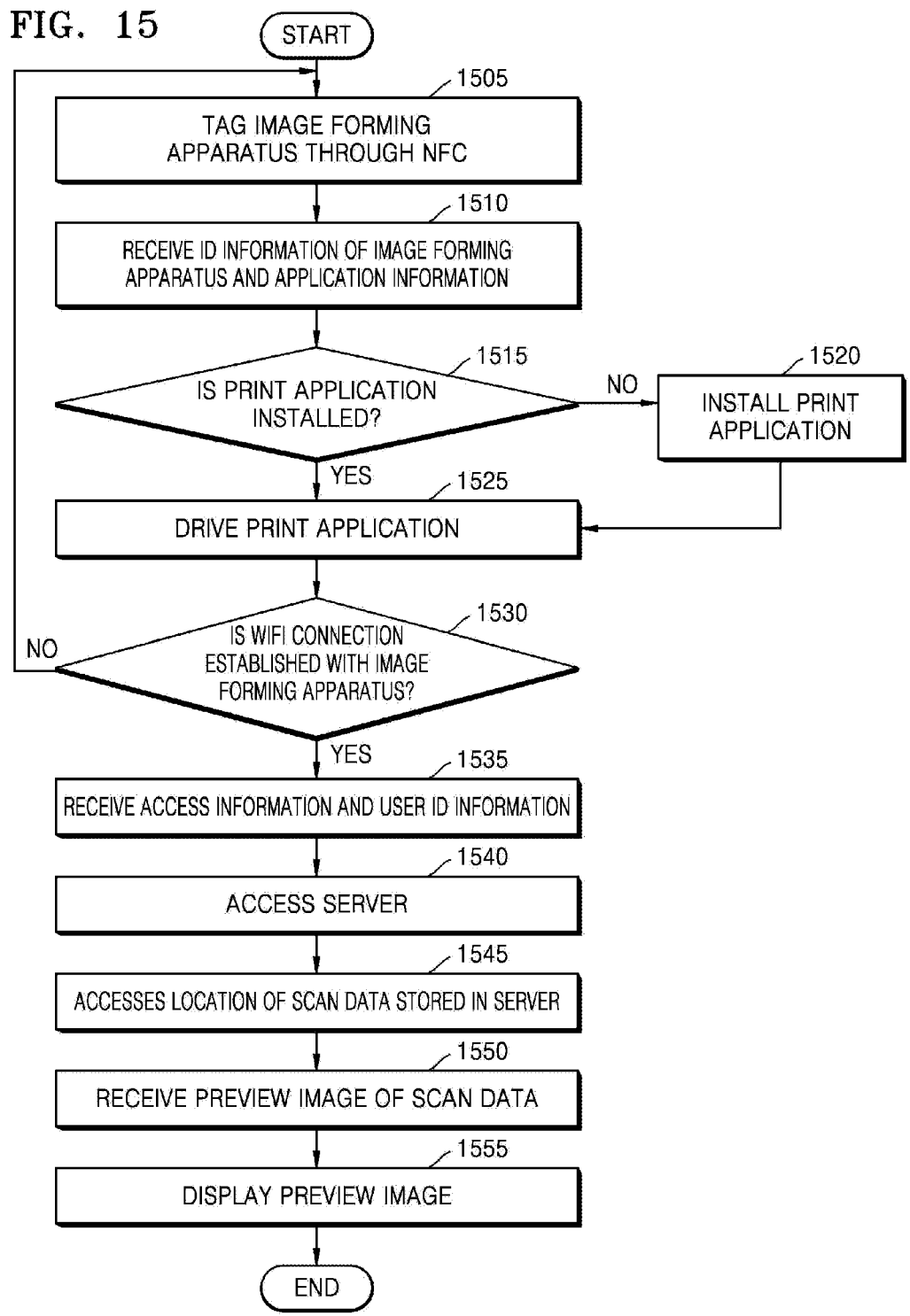

IMAGE FORMING APPARATUS SUPPORTING NEAR-FIELD COMMUNICATION (NFC) FUNCTION, AND METHOD OF PREVIEWING SCAN DATA OF IMAGE FORMING APPARATUS ON MOBILE TERMINAL

CROSS-REFERENCE TO RELATED APPLICATIONS

This application claims the priority benefit of Korean Patent Application No. 10-2014-0116375, filed on Sep. 2, 2014, in the Korean Intellectual Property Office, the disclosure of which is incorporated herein in its entirety by reference.

BACKGROUND

1. Field

One or more exemplary embodiments relate to an image forming apparatus supporting a near-field communication (NFC) function and a method of previewing scan data of the image forming apparatus on a mobile terminal.

2. Description of the Related Art

An image forming apparatus includes not only a printing function but also a function of generating scan data by scanning a document. However, a user cannot rapidly view a formed image when a display unit is not included or a display unit capable of displaying only text is included in the image forming apparatus.

SUMMARY

One or more exemplary embodiments include an image forming apparatus supporting a near-field communication (NFC) function and a method of previewing data scanned by the image forming apparatus on a mobile terminal.

According to one or more exemplary embodiments, an image forming apparatus includes a scanner which generates scan data by scanning a document; a communication unit which transmits the scan data to a server, and which receives access information for accessing a preview image of the scan data stored in the server from the server; a near-field communication (NFC) module which tags a mobile terminal on which the preview image is to be displayed through NFC; and a controller which controls the communication unit to transmit the access information to the tagged mobile terminal.

The access information may include identification (ID) information of the server; and location information representing a location of the scan data stored in the server.

The access information may include a uniform resource locator (URL) representing the server ID information and the location information.

The image forming apparatus may further include a user interface which receives user ID information for accessing the server. The access information may include the location information of the scan data mapped to the user ID information.

The communication unit may map user ID information for accessing the server to the scan data and transmit the user ID information to the server.

When the mobile terminal is tagged, the NFC module may transmit, to the mobile terminal, application information for executing a print application in the mobile terminal.

The communication unit may receive, from the mobile terminal, an acknowledgement signal indicating that the transmission of the access information to the mobile terminal is completed. The image forming apparatus may further include a user interface which may provide a guide message inquiring whether scan data is to be generated again when the acknowledgement signal is received.

When a request to generate scan data again is received, the scanner may generate new scan data, and the communication unit may map the new scan data to user ID information received via the user interface, and transmit the new scan data to the server.

When authentication for establishing a wireless connection between the communication unit and the mobile terminal through NFC is completed, the communication unit may transmit the access information to the mobile terminal through the wireless connection.

According to one or more exemplary embodiments, a mobile terminal supporting near-field communication (NFC) includes an NFC module which tags an image forming apparatus which stores scan data in a server; a communication unit which receives access information for accessing a preview image of the scan data stored in the server from the image forming apparatus, and which receives the preview image from the server based on the access information; and a user interface which displays the preview image.

The access information may include identification (ID) information of the server; and location information representing a location of the scan data stored in the server.

The communication unit may receive user ID information mapped to the scan data and used to access the server from the image forming apparatus. The access information may include location information of the scan data mapped to the user ID information.

The communication unit may access the server based on ID information of the server and user ID information for accessing the server), and receive a preview image of the scan data based on location information representing a location of the scan data stored in the server.

The NFC module may receive, from the image forming apparatus, application information for executing a print application in the mobile terminal when the image forming apparatus is tagged. The mobile terminal may further include a controller for controlling the print application to be executed using the application information.

According to one or more exemplary embodiments, a method of providing a preview image of scan data of an image forming apparatus includes generating the scan data by scanning a document; transmitting the scan data to a server; receiving, from the server, access information for accessing the preview image of the scan data stored in the server; tagging a mobile terminal on which the preview image is to be displayed through near-field communication (NFC); and transmitting the access information to the tagged mobile terminal.

The access information may include identification (ID) information of the server; and location information representing a location of the scan data stored in the server.

The method may further include receiving user ID information for accessing the server via a user interface. The transmitting of the scan data to the server may include mapping the user ID information to the scan data and transmitting the user ID information to the server.

The method may further include receiving, from the mobile terminal, an acknowledgement signal indicating that the transmission of the access information to the mobile terminal is completed; and providing a guide message inquiring whether scan data is to be generated again when the acknowledgement signal is received.

According to one or more exemplary embodiments, a method of previewing scan data of an image forming apparatus on a mobile terminal includes tagging the image forming apparatus to store the scan data in a server; receiving, from the image forming apparatus, access information for accessing a preview image of the scan data stored in the server; receiving the preview image from the server, based on the access information; and displaying the preview image.

The receiving of the preview image from the server may include accessing the server, based on identification (ID) information of the server and user ID information for accessing the server; and receiving the preview image of the scan data, based on location information representing a location of the scan data stored in the server.

According to one or more exemplary embodiments, an image forming apparatus includes a scanner to scan a document to generate scan data; a communicator configured to transmit the scan data to a server, and configured to receive access information for accessing a preview image of the scan data stored in the server from the server; a near-field communication (NFC) module configured to tag a mobile terminal on which the preview image is to be displayed through NFC; and a controller configured to control the communicator to transmit the access information to the tagged mobile terminal.

According to one or more exemplary embodiments, a mobile terminal supporting near-field communication (NFC) includes an NFC module configured to tag an image forming apparatus which stores scan data in a server; a communicator configured to receive access information for accessing a preview image of the scan data stored in the server from the image forming apparatus, and configured to receive the preview image from the server based on the access information; and a user interface configured to display the preview image.

According to one or more exemplary embodiments, there is provided at least one non-transitory computer readable medium storing computer readable instructions to implement methods of one or more exemplary embodiments.

BRIEF DESCRIPTION OF THE DRAWINGS

These and/or other aspects will become apparent and more readily appreciated from the following description of exemplary embodiments, taken in conjunction with the accompanying drawings in which:

FIG. 8 is a diagram illustrating a process of providing a preview image of scan data using an image forming apparatus supporting the NFC function according to an exemplary embodiment;

FIG. 15 is a flowchart of a method of previewing scan data on a mobile terminal, according to an exemplary embodiment.

DETAILED DESCRIPTION

Figure 1:
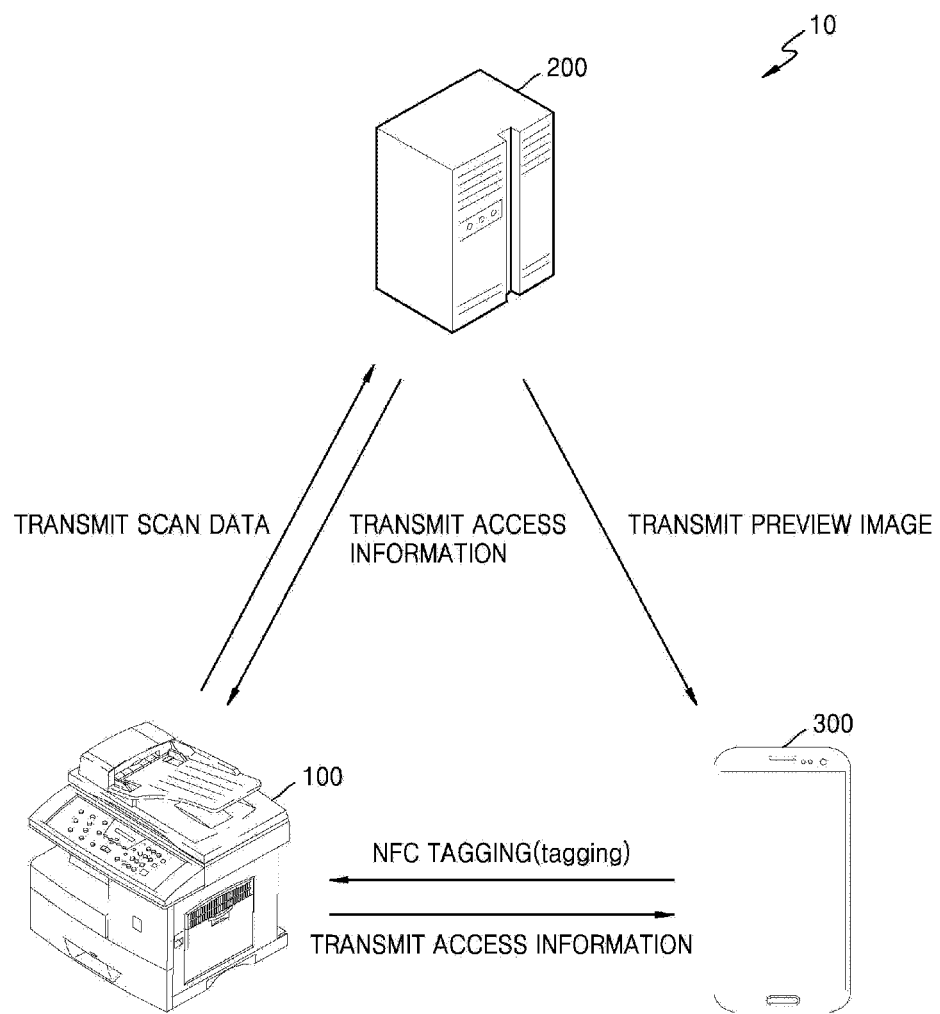
FIG. 1 is a diagram illustrating a system including an image forming apparatus with a near-field communication (NFC) function, according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present description. Exemplary embodiments will now be described more fully with reference to the accompanying drawings. In the following description, well-known functions or constructions are not described in detail if it is determined that they would obscure one or more exemplary embodiments due to unnecessary detail.

FIG. 1 is a diagram illustrating a system 10 including an image forming apparatus 100 with a near-field communication (NFC) function, according to an exemplary embodiment.

Referring to FIG. 1, the system 10 includes the image forming apparatus 100, a server 200, and a mobile terminal 300. Both the image forming apparatus 100 and the mobile terminal 300 supports an NFC function.

The image forming apparatus 100 may include a scanner capable of scanning a document or a multi-functional peripheral (MFP) with various functions such as printing, scanning, copying, faxing, a file server function, web browsing, etc.

The server 200 may include a cloud server with a cloud service function.

The mobile terminal 300 may be a mobile phone, a smartphone, a personal digital assistant (PDA), a portable multimedia player (PMP), a tablet personal computer (PC), or the like.

When receiving a scan request from a user, the image forming apparatus 100 generates scan data by scanning a document. The image forming apparatus 100 may receive the scan request from the user via either a user interface thereof or the mobile terminal 300.

The image forming apparatus 100 transmits the scan data to the server 200 so as to store the scan data in the server 200. The server 200 stores the scan data, generates access information for the stored scan data, and transmits the access information to the image forming apparatus 100. The image forming apparatus 100 stores the access information received from the server 200.

The access information for the scan data is information for accessing a preview image of the scan data stored in the server 200, and may include server identification (ID) information regarding the server 200 storing the scan data and location information of a location of the scan data stored in the server 200. For example, the access information may be a uniform resource locator (URL) representing the server ID information and the location information, e.g., "google.com/directory1/subdirectory/123.jpg". In the access information, "google.com" may be the server ID information and "/directory1/subdirectory/123.jpg" may be the location information. However, the access information is not limited thereto and may include various types of information.

The server ID information is unique ID information identifying the server 200 storing the scan data. For example, when the server 200 is a cloud server, the server ID information may be a domain name such as "google.com", dropbox.com", "evernote.com", etc. Otherwise, the server ID information may be information regarding a unique application for accessing the server 200. For example, the server ID information may be address information for driving a Google application required to access a Google's server. The server ID information is not, however, limited thereto and may include various types of information.

The location information may represent the location of the scan data stored in the server 200, the location of a thumbnail type preview image related to the scan data, etc. For example, the location information may be the address of a folder of the server 200 storing the scan data but is not limited thereto and may include various types of information. The location information may be generated when the scan data is stored in the server 200, and may be expressed as "/directory1/subdirectory/123.jpg".

Referring to FIG. 1, when the image forming apparatus 100 tags the mobile terminal 300, the image forming apparatus 100 transmits the access information including the location information to the mobile terminal 300. The mobile terminal 300 may access the scan data stored in the server 200 by using the access information. For example, the mobile terminal 300 may display a preview image of the entire or a portion of the scan data so that a user may view it or download the scan data by using the access information.

Thus, the user may rapidly check the state of the scan data on the mobile terminal 300 and request to scan the document again when the user is not satisfied with the state of the scan data.

Figure 2:
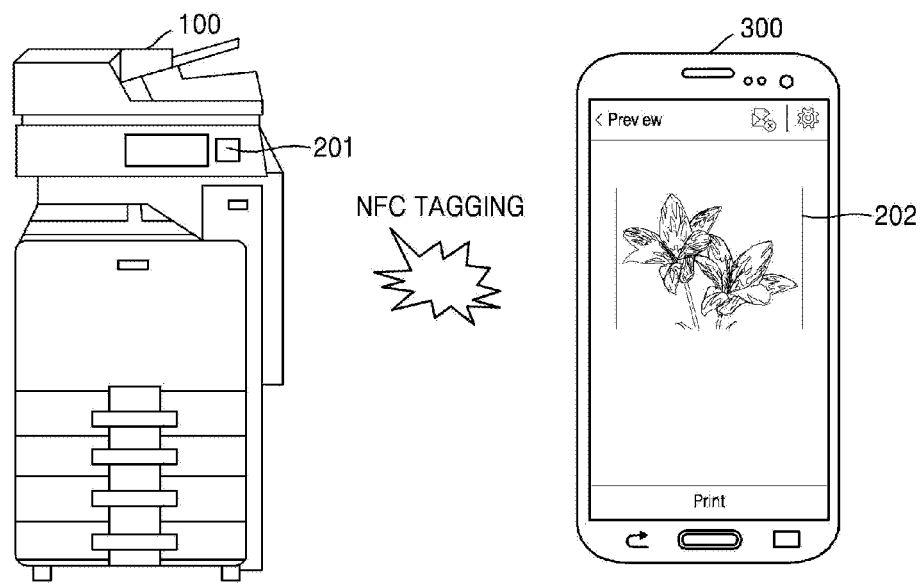
FIG. 2 is a diagram illustrating a process of previewing data scanned by an image forming apparatus on a mobile terminal, according to an exemplary embodiment.

FIG. 2 is a diagram illustrating a process of previewing data scanned by an image forming apparatus 100 on a mobile terminal 300, according to an exemplary embodiment.

A user may generate scan data using the image forming apparatus 100, and rapidly check the scan data using the mobile terminal 300. For example, the user may rapidly check the scan data by viewing a preview image of the scan data on the mobile terminal 300.

Referring to FIG. 2, when the image forming apparatus 100 completes generating and transmitting the scan data and receiving access information, the mobile terminal 300 tags the image forming apparatus 100. For example, the mobile terminal 300 may tag an NFC tag 201 of the image forming apparatus 100. When the mobile terminal 300 tags the NFC tag 201 of the image forming apparatus 100, the mobile terminal 300 receives the access information from the image forming apparatus 100. The mobile terminal 300 may receive a preview image 202 from the server 200 of FIG. 1 and display the preview image 202 so that the user may view it, based on the access information.

Figure 3:
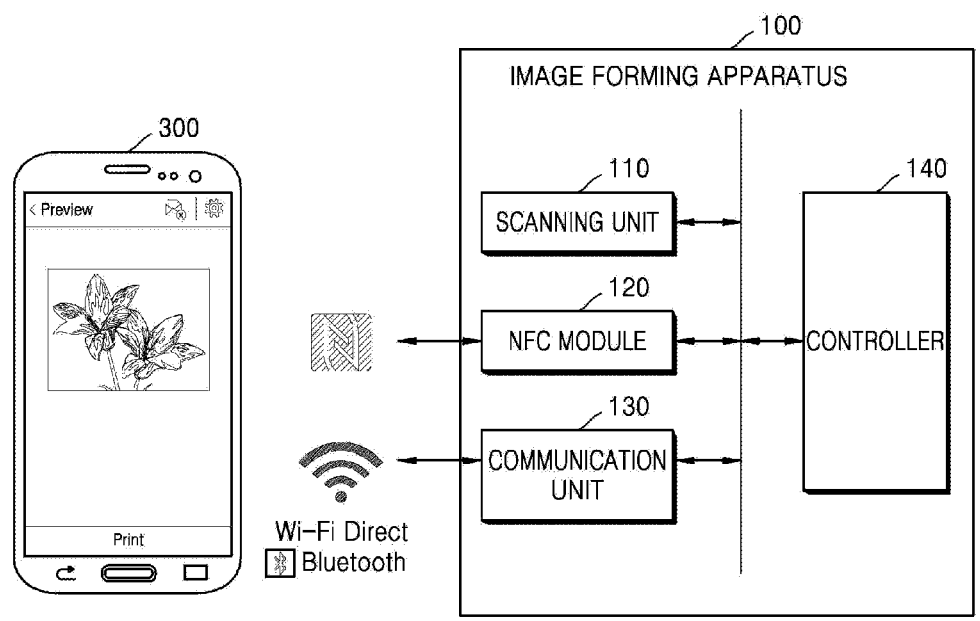
FIG. 3 is a block diagram of a structure of an image forming apparatus supporting the NFC function, according to an exemplary embodiment.

FIG. 3 is a block diagram of a structure of an image forming apparatus 100 supporting an NFC function, according to an exemplary embodiment.

In the present exemplary embodiment of FIG. 3, only components of the image forming apparatus 100 related to the present exemplary embodiment will be described to prevent the features of the present exemplary embodiment from being obscure. However, it would be obvious to those of ordinary skill in the art that the image forming apparatus 100 may further include other general-purpose components.

Referring to FIG. 3, the image forming apparatus 100 according to the present exemplary embodiment includes a scanning unit (scanner) 110, an NFC module 120, a communication unit (communicator) 130, and a controller 140.

The scanning unit 110 may be understood as a structure for performing scanning. The scanning unit 110 according to the present exemplary embodiment generates scan data by scanning a document. The image forming apparatus 100 according to the present exemplary embodiment may further include a structure for performing various functions such as scanning, printing, copying, facsimile transmitting/receiving, email transmitting, etc.

The NFC module 120 may perform an NFC function, read information from or write information to an NFC tag, and support link-level communication between two NFC devices. The NFC module 120 may communicate with a main board via a universal asynchronous receiver/transmitter (UART), an inter-integrated circuit ($I^2C$), a serial peripheral interface bus (SPI), etc. Also, the NFC module 120 may be embedded in the image forming apparatus 100 beforehand during factory shipment or may be available by installing an NFC tag by a user after factory shipment.

The NFC module 120 may operate while interlocked with a different wire/wireless network such as WiFi, WiFi direct, Bluetooth, Ethernet, 802.11a/b/g/n, etc. For example, the NFC module 120 may be used to perform authentication for establishing a wireless connection between devices according to a different manner other than NFC using the communication unit 130, and the wireless connection may be established between the devices according to the different manner so as to exchange data between the devices. When the mobile terminal 300 is tagged, the NFC module 120 may receive or transmit information for performing authentication to establish the connection with the mobile terminal 300 via WiFi by using the communication unit 130. In detail, the NFC module 120 may transmit the ID information of the image forming apparatus 100 among the information stored in the NFC tag beforehand to the mobile terminal 300.

The ID information of the image forming apparatus 100 is unique information of the image forming apparatus 100 and may be used to establish the wireless connection between the image forming apparatus 100 and the mobile terminal 300 according to a manner other than NFC. For example, the ID information of the image forming apparatus 100 may include a media access control (MAC) address and an Internet protocol (IP) address thereof, etc.

Also, when the mobile terminal 300 is tagged, the NFC module 120 may transmit application information for driving a print application in the mobile terminal 300 to the mobile terminal 300.

The print application is an application that controls the image forming apparatus 100 and may be an application facilitating the mobile terminal 300 to perform various jobs that may be performed by the image forming apparatus 100. The application information is information for driving the print application in the mobile terminal 300 and may include a drive command for driving the print application and address information for installing the print application.

When the print application has already been installed in the mobile terminal 300, the mobile terminal 300 may receive the application information from the NFC tag of the image forming apparatus 100 and drive the print application according to the drive command included in the application information.

When the print application is not installed in the mobile terminal 300, the mobile terminal 300 may install the print application therein based on the address information included in the application information. For example, the mobile terminal 300 may download an installation file of the print application based on the address information, and install the print application using the installation file.

The NFC module 120 may support link-level communication between the image forming apparatus 100 and the mobile terminal 300. When the mobile terminal 300 is tagged, the NFC module 120 may transmit data in an NFC data exchange format (NDEF) message format to the mobile terminal 300. For example, the NFC module 120 may insert the access information stored in the storage unit (storage) 150 into an NDEF message and transmit the NDEF message to the mobile terminal 300. Also, the NFC module 120 may insert the application information and the access information in an NDEF message and transmit the NDEF message to the mobile terminal 300.

The NFC module 120 may transmit the access information to the mobile terminal 300 by using a dynamic NFC tag installed on the image forming apparatus 100. For example, the image forming apparatus 100 may store the access information received from the server 200 in the dynamic NFC tag, and the NFC module 120 may transmit the stored access information to the mobile terminal 300 when the mobile terminal 300 is tagged.

The communication unit 130 is configured to exchange data with an external device via wire/wired communication. The communication unit 130 may include a WiFi module, a WiFi Direct module, a Bluetooth module, an Ethernet module, etc.

The communication unit 130 transmits scan data to the server 200 so as to store the scan data in the server 200. The communication unit 130 receives access information for accessing a preview image of the scan data from the server 200.

The communication unit 130 may operate while interlocked with the NFC module 120 to establish a wireless connection with the mobile terminal 300 according to a connection manner other than NFC. For example, when the mobile terminal 300 is tagged, the NFC module 120 may transmit to the mobile terminal 300 the ID information of the image forming apparatus 100 to be used to perform authentication for establishing the wireless connection with the mobile terminal according to a different manner. When the authentication for establishing the wireless connection with the mobile terminal 300 is completed based on the ID information of the image forming apparatus 100, the communication unit 130 may establish the wireless connection with the mobile terminal 300. The communication unit 130 may establish the wireless connection with the mobile terminal 300 using WiFi, WiFi Direct, Bluetooth, etc.

The communication unit 130 may transmit the access information including the server ID information and the location information to the mobile terminal 300 by establishing the connection between the image forming apparatus 100 and the mobile terminal 300 via WiFi. Also, the communication unit 130 may map user ID information for accessing the server 200 to the access information and transmit the user ID information to the mobile terminal 300 via WiFi.

The communication unit 130 may receive an acknowledgement signal indicating that the transmission of the access information to the mobile terminal 300 is completed from the mobile terminal 300.

The controller 140 is configured to control overall operations of the image forming apparatus 100 and may include, for example, a central processing unit (CPU).

The controller 140 may determine whether the access information for the scan data transmitted from the server 200 is received from the server 200. When it is determined that the access information is received, the controller 140 may control the access information to be stored to be mapped to the user ID information.

When the mobile terminal 300 is tagged, the controller 140 may determine whether wireless communication is established between the image forming apparatus 100 and the mobile terminal 300. When it is determined that wireless communication is established between the image forming apparatus 100 and the mobile terminal 300, the controller 140 may control the communication unit 130 to transmit the access information to the mobile terminal 300. The controller 140 may control the communication unit 130 to map the user ID information for accessing the server 200 to the access information and transmit the user ID information to the mobile terminal 300.

Figure 4:
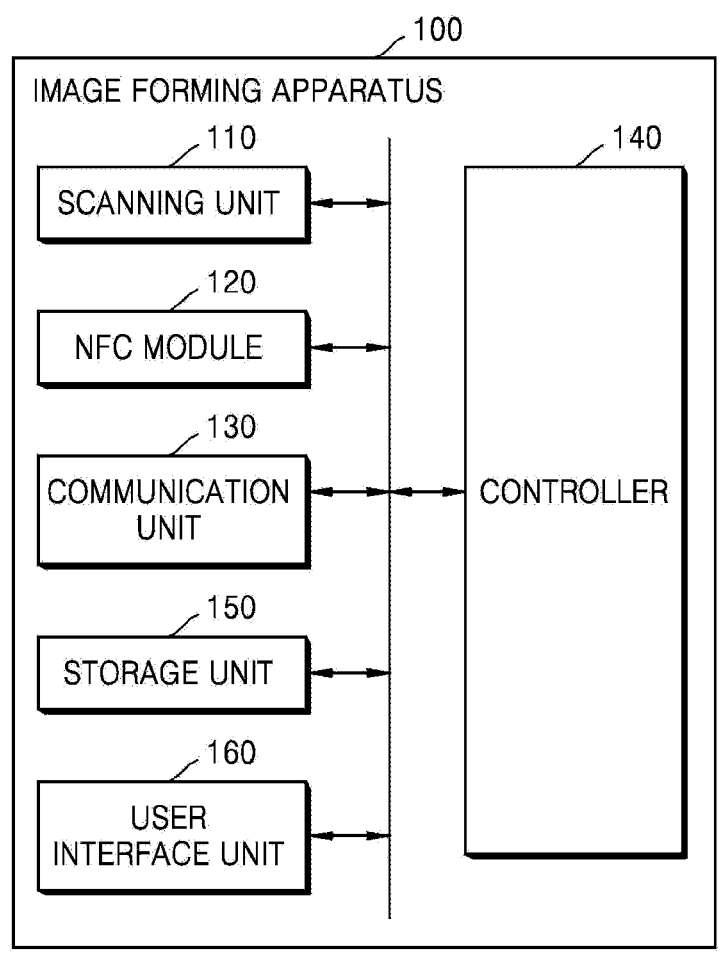
FIG. 4 is a block diagram of a structure of an image forming apparatus supporting the NFC function, according to an exemplary embodiment.

FIG. 4 is a block diagram of a structure of an image forming apparatus 100 supporting the NFC function, according to an exemplary embodiment.

Referring to FIG. 4, the image forming apparatus 100 according to the present exemplary embodiment includes a scanning unit 110, an NFC module 120, a communication unit 130, a storage unit 150, a user interface unit (user interface) 160, and a controller 140.

The scanning unit 110, the NFC module 120, the communication unit 130, and the controller 140 of the image forming apparatus 100 according to the present exemplary embodiment may operate similar to the scanning unit 110, the NFC module 120, the communication unit 130, and the controller 140 described above with reference to FIG. 3.

The storage unit 150 is configured to store print data, scan data, etc., and may include, for example, a volatile memory such as random access memory (RAM), a nonvolatile memory such as a read-only memory (ROM), a hard disk drive (HDD), or a solid-state drive (SSD).

The storage unit 150 may store the access information received from the server 200 of FIG. 1. For example, the storage unit 150 may store the access information to be mapped to user ID information.

The user interface unit 160 is an element via which a user may check information regarding the image forming apparatus 100 and input a command to the image forming apparatus 100.

A structure having a display function of the user interface unit 160 may be configured as a 2-line or 4-line liquid crystal display (LCD) or light-emitting diode (LED) or may be embodied as a graphical user interface (GUI) to present various graphic representations.

A structure having an input function of the user interface unit 160 may include an electrostatic/pressure-sensitive touch screen, a keyboard, a mouse, or physical buttons.

The user interface unit 160 may include only elements having an input function without elements having a display function. For example, the user interface unit 160 may include only physical buttons or may be embodied as a display having only a text display function.

The user interface unit 160 may receive user ID information and a scan request from a user. The user ID information is unique information identifying the user and may be used to access the server 200. For example, the user ID information may include information such as the name or ID of the user, and may further include a user password.

When the communication unit 130 receives access information for scan data from the server 200, the user interface unit 160 may display a guide message requesting to tag the mobile terminal 300. Also, the user interface unit 160 may continuously display the request to tag the mobile terminal 300 until the user interface unit 160 receives an acknowledgement signal indicating that the transmission of the access information to the mobile terminal 300 is completed.

Also, the user interface unit 160 may receive a job end request from the user who does not want to tag the mobile terminal 300. When the job end request is received via the user interface unit 160, the image forming apparatus 100 ends the job. When the job is ended, the image forming apparatus 100 may delete the user ID information and the access information.

The user interface unit 160 may display a guide message inquiring whether scan data is to be generated again. For example, when the communication unit 130 receives an acknowledgement signal indicating that the transmission of the access information to the mobile terminal 300 is completed from the mobile terminal 300, the user interface unit 160 may display a guide message inquiring whether scan data is to be generated again.

Also, the user interface unit 160 may receive a request to generate scan data again from the user. When the request to generate scan data again is received via the user interface unit 160, the image forming apparatus 100 may generate new scan data by scanning a document again. The communication unit 130 may map the new scan data to the user ID information received beforehand from the user interface unit 160 and transmit the new scan data to the server 200.

The communication unit 130 may map the user ID information for accessing the server 200 to the scan data and transmit the user ID information to the server 200. The server 200 may store the scan data and the user ID information to be mapped to each other. For example, the server 200 may store the scan data at an address assigned to the user's account corresponding to the user ID information, and generate location information indicating a location of the scan data stored in the server 200

The communication unit 130 may receive from the server 200 access information including the server ID information and the location information indicating the location in the server 200 in which the scan data mapped to the user ID information is stored. The access information may include a URL representing the server ID information and the location information.

Figure 5:
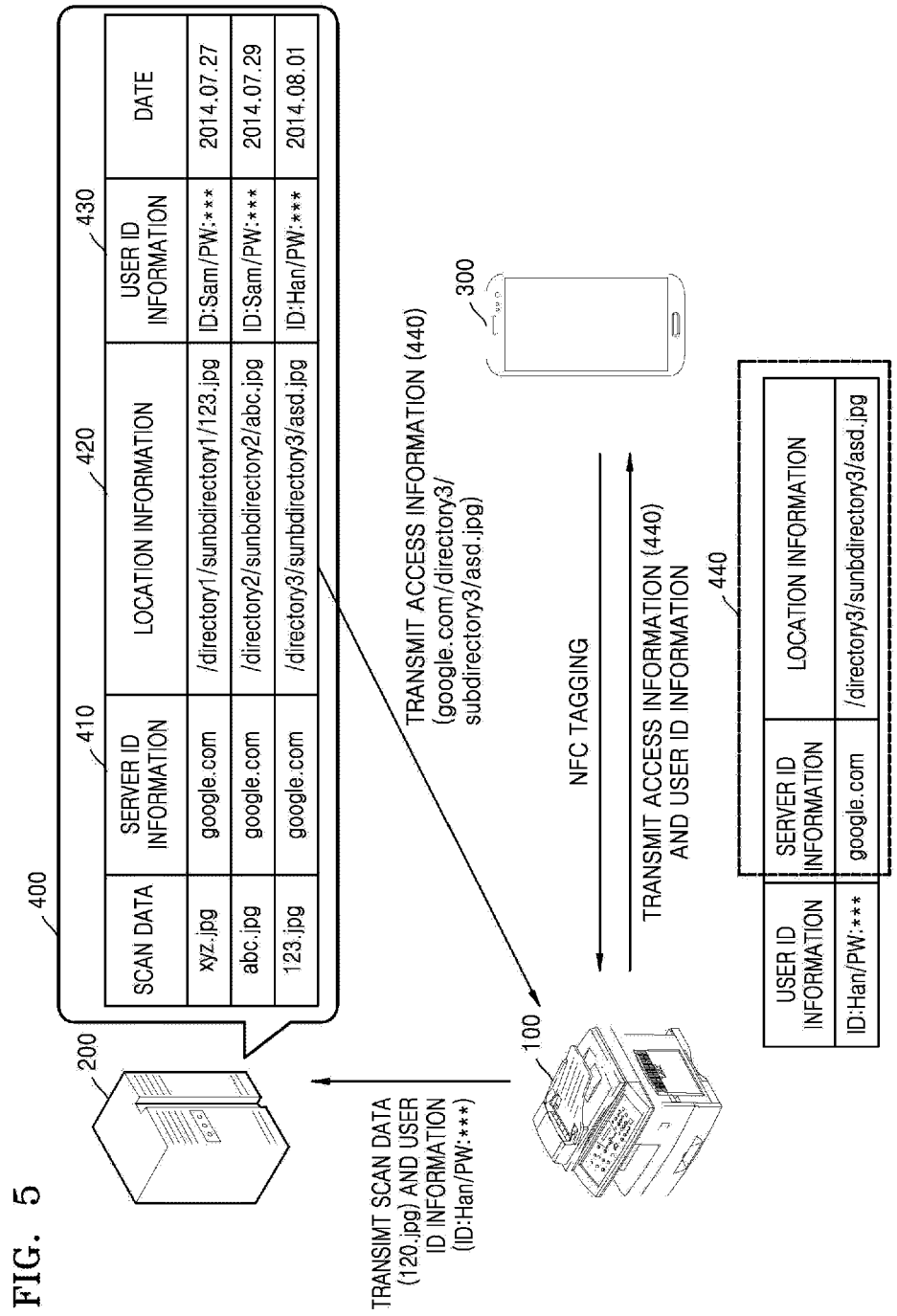
FIG. 5 is a diagram illustrating a process of transmitting/receiving access information for scan data, which is performed by an image forming apparatus, according to an exemplary embodiment.

FIG. 5 is a diagram illustrating a process of transmitting/receiving access information for scan data, which is performed by an image forming apparatus 100, according to an exemplary embodiment.

Referring to FIG. 5, the image forming apparatus 100 transmits scan data generated by scanning a document to a server 200. Also, the image forming apparatus 100 may map user ID information received from a user to the scan data and transmit the user ID information to the server 200. For example, the image forming apparatus 100 may map user ID information "ID:Han/PW:*" to scan data "123.jpg" and transmit the user ID information "ID:Han/PW:*" to the server 200.

The server 200 stores the scan data. The server 200 may store the scan data at an address assigned to each of users' accounts corresponding to the user ID information. For example, the scan data may be mapped to the user ID information and stored in the form of a scan data table 400 including a server ID information field 410.

The server 200 generates and stores location information indicating a location of the scan data stored in the server 200. The scan data table 400 may further include a location information field 420 in which the location information is stored. For example, the server 200 may generate location information "/directory3/subdirectory3/asd.jpg" of scan data "123.jpg" and store it in the scan data table 400.

The image forming apparatus 100 receives access information 440 including server ID information "google.com" and location information "/directory3/subdirectory3/asd.jpg" from the server 200. The image forming apparatus 100 may map the access information 440 to the user ID information received from the user and store the access information 440 in the storage unit 150 of the image forming apparatus 100 or a dynamic NFC tag. The scan data table 400 may further include a User ID Information field 430 in which the User ID information is stored. For example, the image forming apparatus 100 may receive access information "google.com/directory3/subdirectory3/asd.jpg" from the server 200, and store it to be mapped to user ID information "ID:Han/PW:***".

The image forming apparatus 100 may transmit to the mobile terminal 300 the access information 440 and the user ID information mapped to the access information 440. For example, the image forming apparatus 100 may map access information "google.com/directory3/subdirectory3/asd.jpg" to user ID information "ID:Han/PW:*" and transmit the access information and the user ID information to the mobile terminal 300**.

Figure 6:
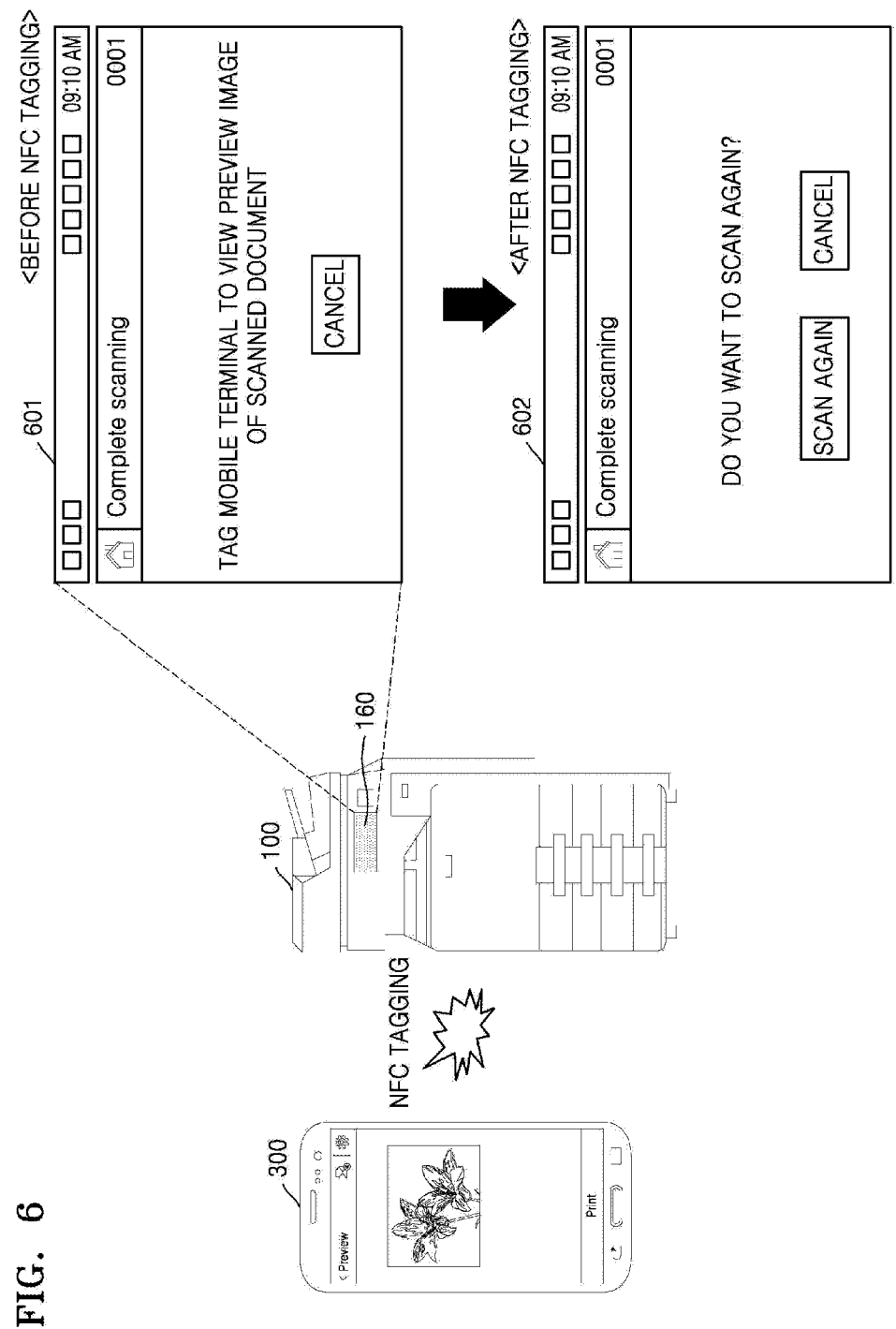
FIG. 6 is a diagram illustrating a process of providing a guide message to a user, which is performed by an image forming apparatus, according to an exemplary embodiment.

FIG. 6 is a diagram illustrating a process of providing a guide message to a user, which is performed by an image forming apparatus 100, according to an exemplary embodiment.

Referring to FIG. 6, when a scan job is completed, the user interface unit 160 of the image forming apparatus 100 may display a guide message 601 requesting to tag a mobile terminal 300. For example, when the communication unit 130 receives access information from a server 200, the user interface unit 160 of the image forming apparatus 100 may display the guide message 601 requesting to tag the mobile terminal 300. Also, the user interface unit 160 of the image forming apparatus 100 may continuously display the guide message 601 requesting to tag the mobile terminal 300 until the communication unit 130 receives an acknowledgement signal indicating that transmission of the access information is completed.

The guide message 601 requesting to tag the mobile terminal 300 may include a 'cancel' button for receiving a job end request from a user. When the job end request is received from the user, the image forming apparatus 100 may end a job. When the job is ended, the controller 140 may delete the user ID information and the access information.

After the mobile terminal 300 is tagged, the user interface unit 160 of the image forming apparatus 100 may display a guide message 602 inquiring whether scan data is to be generated again. For example, when the communication unit 130 receives an acknowledgement signal indicating that transmission of the access information to the mobile terminal 300 is completed, the user interface unit 160 of the image forming apparatus 100 may display the guide message 602 inquiring whether the scan data is to be generated again.

The guide message 602 inquiring whether the scan data is to be generated again scan data may include a button for receiving a request to generate scan data again and a job end button from a user. For example, when the request to generate scan data again is received, the controller 140 may control new scan data to be generated by scanning a document again. When the job end request is received, the controller 140 may end the job.

Figure 7A:
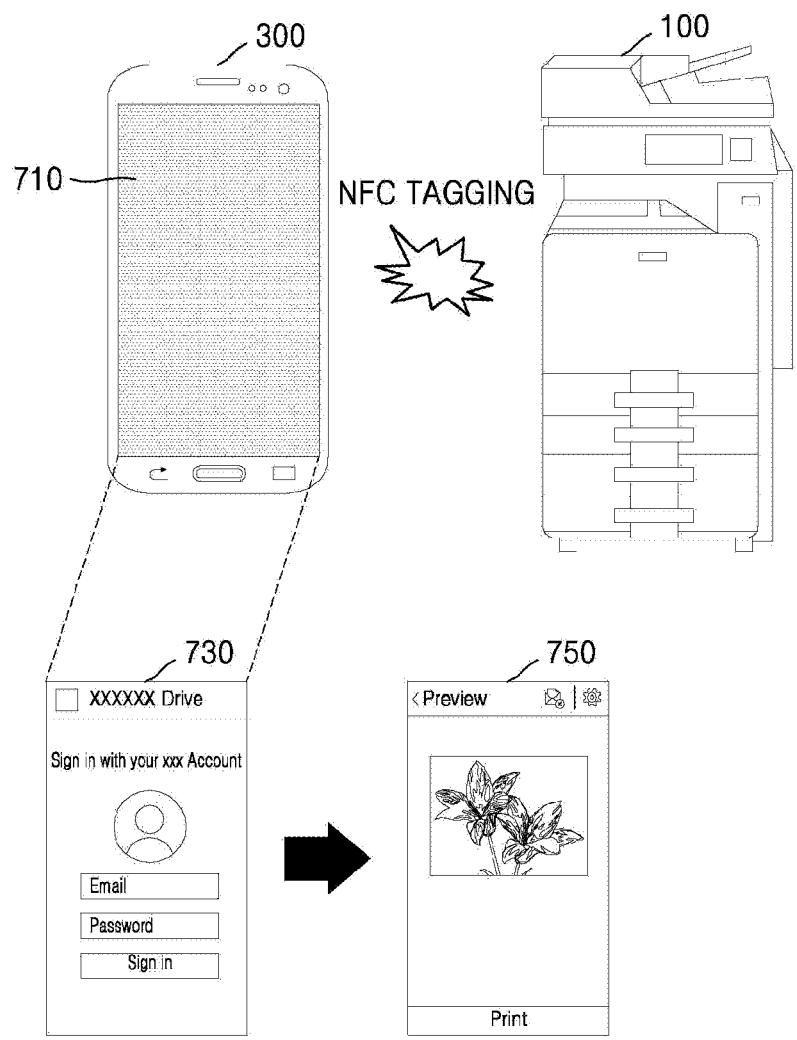
FIGS. 7A and 7B are diagrams illustrating processes of displaying a preview image using a mobile terminal supporting the NFC function according to exemplary embodiments.
Figure 7B:
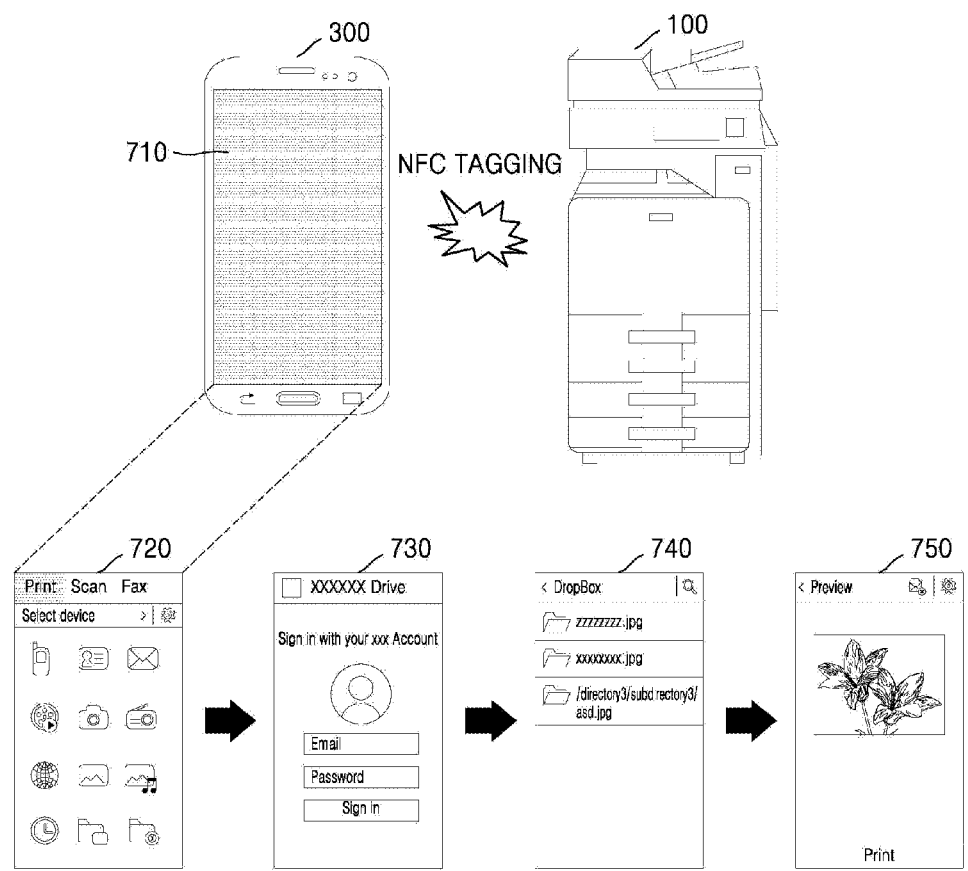

FIGS. 7A and 7B are diagrams illustrating processes of displaying a preview image using a mobile terminal 300 supporting the NFC function, according to exemplary embodiments.

FIG. 7A is a diagram illustrating a process of displaying a preview image when the mobile terminal 300 receives access information, according to an exemplary embodiment.

It is assumed that a print application for controlling an image forming apparatus 100 is installed in the mobile terminal 300. When the print application is not installed, the mobile terminal 300 may install the print application by using application information received from the image forming apparatus 100.

Referring to FIG. 7A, the mobile terminal 300 receives access information for accessing a preview image of scan data from the image forming apparatus 100 when the image forming apparatus 100 is tagged. Also, the mobile terminal 300 may receive application information for driving the print application from the image forming apparatus 100.

The mobile terminal 300 may drive the print application by using the application information. Also, the mobile terminal 300 may select a server 200 to be accessed, based on server ID information included in the access information. For example, the mobile terminal 300 may select the server 200 corresponding to the server ID information, based on the server ID information.

When the server 200 is selected, the mobile terminal 300 may display a screen 730 on a display 710 for logging in to the server 200. The mobile terminal 300 may receive user ID information for logging in to the server 200 from a user via a user interface of the mobile terminal 300, and log in to the server 200 based on the user ID information.

When the mobile terminal 300 logs in to the server 200 and accesses the server 200, the mobile terminal 300 may display a preview image 750 using the access information. For example, the mobile terminal 300 may receive the preview image 750, based on location information representing a location in the server 200 in which scan data included in the access information is stored. The mobile terminal 300 may display the preview image 750.

When user ID information is received together with the access information from the image forming apparatus 100, the mobile terminal 300 may directly display the preview image 750. For example, the mobile terminal 300 may log in to access the server 200 based on the user ID information received from the image forming apparatus 100. In this case, the screen 730 for logging in to the server 200 may be omitted and the preview image 750 may be directly displayed.

FIG. 7B is a diagram illustrating a process of displaying a preview image by a mobile terminal 300, according to an exemplary embodiment.

Referring to FIG. 7B, when an image forming apparatus 100 is tagged, the mobile terminal 300 may drive a print application by receiving application information from the image forming apparatus 100. Also, the mobile terminal 300 may drive the print application when a user selects the print application.

The mobile terminal 300 may display a screen 720 on which the print application is driven. The screen 720 on which the print application is driven may include lists of the server 200 for storing a list of jobs that may be selected by the user and performed by the image forming apparatus 100 and data such as scan data. For example, a user may select "Google Drive" which is one of the lists of the server 200 via a user interface, and the mobile terminal 300 may try to access "Google Server" which is the server 200 corresponding to the selected list of the server 200.

The mobile terminal 300 may display a login screen 730 for accessing the server 200. For example, the mobile terminal 300 may display the login screen 730 for accessing the "Google Server". The mobile terminal 300 may receive user ID information from a user via the user interface and log in to the server 200 by using the user ID information.

The mobile terminal 300 may access the server 200 and display a file search screen 740. For example, the file search screen 740 may include a list of various files including scan data stored in the server 200. The mobile terminal 300 may receive the scan data selected by the user via the user interface, and receive a preview image of the selected scan data.

The mobile terminal 300 may display a received preview image 750.

When the mobile terminal 300 receives server ID information from the image forming apparatus 100, the server 200 which is to be accessed may be automatically selected based on the server ID information. Thus, the mobile terminal 300 may sequentially display the login screen 730, the file search screen 740, and the preview image 750 without displaying the screen 720 on which an application is driven.

When receiving the user ID information from the image forming apparatus 100, the mobile terminal 300 may automatically log in to the server 200 based on the user ID information. Thus, the mobile terminal 300 may sequentially display the file search screen 740 and the preview image 750 without displaying the login screen 730.

When receiving location information from the image forming apparatus 100, the mobile terminal 300 may automatically and directly access a location of the scan data stored in the server 200, based on the location information. Thus, the mobile terminal 300 may display the preview image 750 without displaying the file search screen 740.

FIG. 8 is a diagram illustrating a process of providing a preview image of scan data using an image forming apparatus 100 supporting the NFC function, according to an exemplary embodiment.

Referring to FIGS. 1 and 8, in operation S810, the image forming apparatus 100 generates scan data by scanning a document. The image forming apparatus 100 may receive a scan request via the user interface unit 160 or from another device, and generate scan data when the scan request is received. Also, the image forming apparatus 100 may receive user ID information from a user via the user interface unit 160 before or after the scan data is generated.

In operation S820, the image forming apparatus 100 transmits the scan data to the server 200. The server 200 to which the scan data is to be transmitted may be determined beforehand by the image forming apparatus 100 or based on the user ID information, or may be selected by a user. Also, the image forming apparatus 100 may map the scan data to the user ID information and transmit the scan data to the server 200.

In operation S830, the server 200 stores the scan data. The server 200 may store the scan data to be mapped to the user ID information. Also, the server 200 may generate location information representing a location of the scan data stored in the server 200.

In operation S840, the server 200 transmits access information for the scan data to the image forming apparatus 100. For example, the server 200 may transmit access information including server ID information and the location information to the image forming apparatus 100.

In operation S850, the image forming apparatus 100 tags a mobile terminal 300 on which a preview image is to be displayed by using the NFC function. For example, the image forming apparatus 100 may display a guide message requesting to tag the mobile terminal 300, and a user may tag the mobile terminal 300 on an NFC tag of the image forming apparatus 100 according to the guide message.

In operation S860, the image forming apparatus 100 transmits the access information to the mobile terminal 300. For example, the image forming apparatus 100 may transmit ID information thereof to the mobile terminal 300 so as to perform authentication for establishing a wireless connection with the mobile terminal 300 when the mobile terminal 300 is tagged using the NFC function, and establish the wireless connection with the mobile terminal 300 when the authentication is completed. The image forming apparatus may transmit the access information to the mobile terminal 300 through the wireless connection.

The image forming apparatus 100 may insert the access information into a message format such as an NDEF and transmit the message format to the mobile terminal 300. Also, the image forming apparatus 100 may store the access information in a dynamic NFC tag, and transmit the access information to the mobile terminal 300 from the dynamic NFC tag when the mobile terminal is tagged using the NFC function.

The image forming apparatus 100 map the access information to the user ID information and transmit the access information.

In operation S870, the mobile terminal 300 accesses the location of the scan data stored in the server 200, based on the access information. The mobile terminal 300 may access the server 200 to access the scan data, based on the access information and the user ID information mapped to the access information.

For example, the mobile terminal 300 may access the server 200 corresponding to the server ID information included in the access information, and log in to the accessed server 200 by using the user ID information. Also, the mobile terminal 300 may access the location of the scan data stored in the server 200, based on the location information included in the access information.

In operation S880, the mobile terminal 300 receives a preview image of the scan data from the server 200 by using the access information. For example, the mobile terminal 300 may receive the preview image of the scan data by using the location information included in the access information. The preview image may be an image of the scan data, a thumbnail type image of the scan data, or the like.

In operation S890, the mobile terminal 300 displays the preview image.

Figure 9:
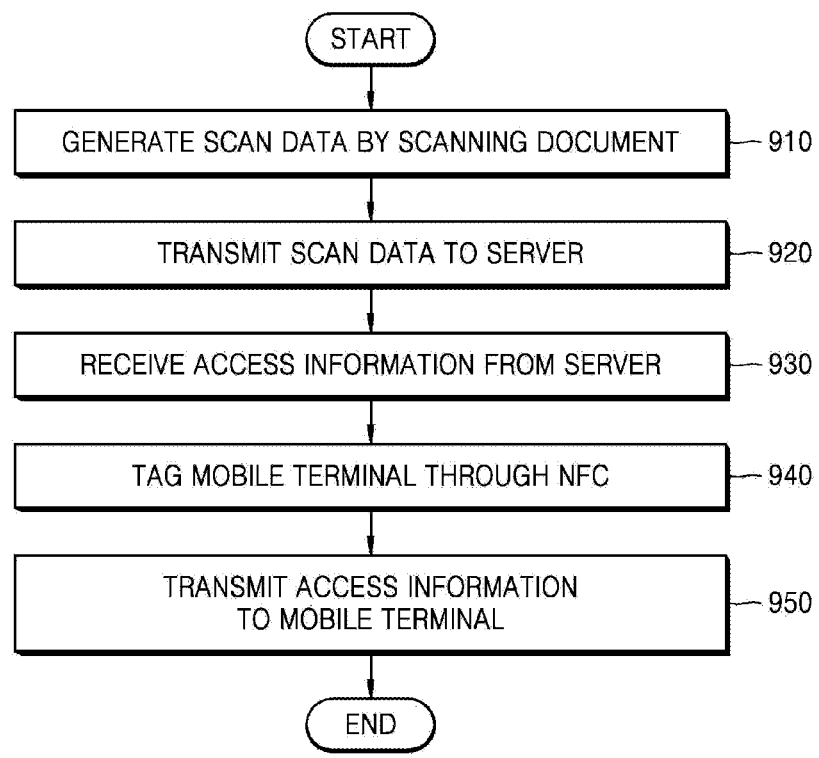
FIG. 9 is a flowchart of a method of providing a preview image of scan data, which is performed by an image forming apparatus supporting the NFC function, according to an exemplary embodiment.

FIG. 9 is a flowchart of a method of providing a preview image of scan data, which is performed by an image forming apparatus supporting the NFC function, according to an exemplary embodiment.

Referring to FIGS. 1 and 9, in operation S910, the image forming apparatus 100 generates scan data by scanning a document.

In operation S920, the image forming apparatus 100 transmits the scan data to the server 200 so as to store the scan data in the server 200. The image forming apparatus 100 may map the scan data to user ID information received from a user and transmit the scan data to the server 200.

In operation S930, the image forming apparatus 100 receives access information for accessing a preview image of the scan data from the server 200. The access information may include ID information of the server 200 and location information representing a location of the scan data stored in the server 200.

In operation S940, the image forming apparatus 100 tags the mobile terminal 300 through NFC.

In operation S950, the image forming apparatus 100 transmits the access information to the mobile terminal 300. For example, the image forming apparatus 100 may transmit ID information thereof to the mobile terminal 300 so as to perform authentication for establishing a wireless connection with the mobile terminal 300 when the mobile terminal 300 is tagged using the NFC function, and establish the wireless connection with the mobile terminal 300 when the authentication is completed. The image forming apparatus 100 may transmit the access information to the mobile terminal 300 through the wireless connection.

Figure 10:
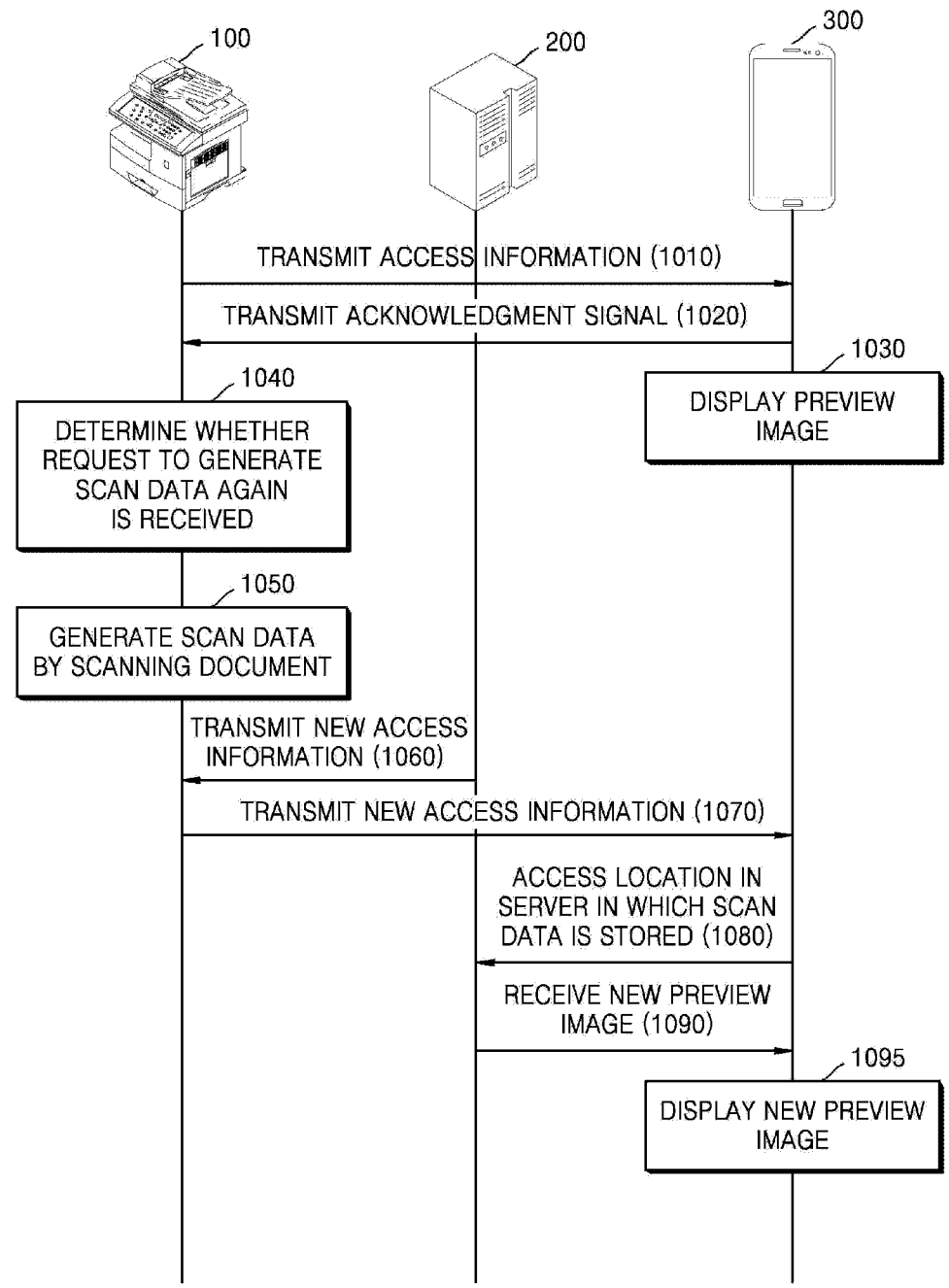
FIG. 10 is a diagram illustrating a process of generating scan data again, which is performed by an image forming apparatus, according to an exemplary embodiment.

FIG. 10 is a diagram illustrating a process of generating scan data again, which is performed by an image forming apparatus 100, according to an exemplary embodiment.

Referring to FIGS. 1 and 10, in operation S1010, the image forming apparatus 100 transmits access information to the mobile terminal 300.

In operation S1020, the mobile terminal 300 transmits an acknowledgement signal to the image forming apparatus 100. The mobile terminal 300 may generate an acknowledgement signal indicating that the receiving of the access information is completed and transmit the acknowledgement signal to the image forming apparatus 100.

In operation S1030, the mobile terminal 300 may display a preview image by using the access information. A user may receive the preview image and check a state of the preview image via the mobile terminal 300.

In operation S1040, the image forming apparatus 100 determines whether a request to generate scan data again is received. For example, when receiving the acknowledgement signal from the mobile terminal 300, the image forming apparatus 100 may provide the user with a guide message inquiring whether scan data is to be generated again. The image forming apparatus 100 may receive a request to generate scan data again or a job end request from the user via the user interface of the image forming apparatus 100. Also, the image forming apparatus 100 may receive a request to generate scan data again from the mobile terminal 300 via the user interface of the mobile terminal 300.

In operation S1050, when receiving the request to generate scan data again, the image forming apparatus 100 generates new scan data by scanning a document. Also, the image forming apparatus 100 transmits the new scan data to the server 200. In this case, the image forming apparatus 100 need not receive user ID information again from the user and may use the user ID information received when previous scan data was generated. For example, the new scan data may be mapped to the user ID information and transmitted to the server 200.

In operation S1060, the server 200 receives the new scan data and transmits new access information to the image forming apparatus 100. For example, the server 200 may delete the previous scan data and store the new scan data, or store the new scan data in a different location without deleting the previous scan data. Also, the server 200 may generate new access information for the new scan data and transmit the new access information to the image forming apparatus 100.

In operation S1070, the image forming apparatus 100 transmits the new access information to the mobile terminal 300. For example, the image forming apparatus 100 may transmit the new access information to the mobile terminal 300 via a wireless connection established between the image forming apparatus 100 and the mobile terminal 300 beforehand.

The image forming apparatus 100 may not have to tag the mobile terminal 300 and transmit application information for driving a print application, since the mobile terminal 300 may receive the new access information via the wireless connection established between the image forming apparatus 100 and the mobile terminal 300 beforehand and the print application may have already been driven. If the print application has not been driven, the mobile terminal 300 may drive the print application by using application information received beforehand.

Since the user ID information and server ID information included in the access information are the same as user ID information and server ID information corresponding to the previous scan data, the image forming apparatus 100 may transmit only new location information included in the new access information to the mobile terminal 300.

In operation S1080, the mobile terminal 300 accesses a location of the new scan data stored in the server 200, based on the new access information. The mobile terminal 300 may access the server 200 and access the location of the new scan data based on the new location information included in the new access information.

In operation S1090, the mobile terminal 300 receives a new preview image from the server 200 based on the new access information.

In operation S1095, the mobile terminal 300 displays the new preview image. The user may be provided with the preview image and may check a scanned state of the new scan data, and request to generate scan data again.

Figure 11:
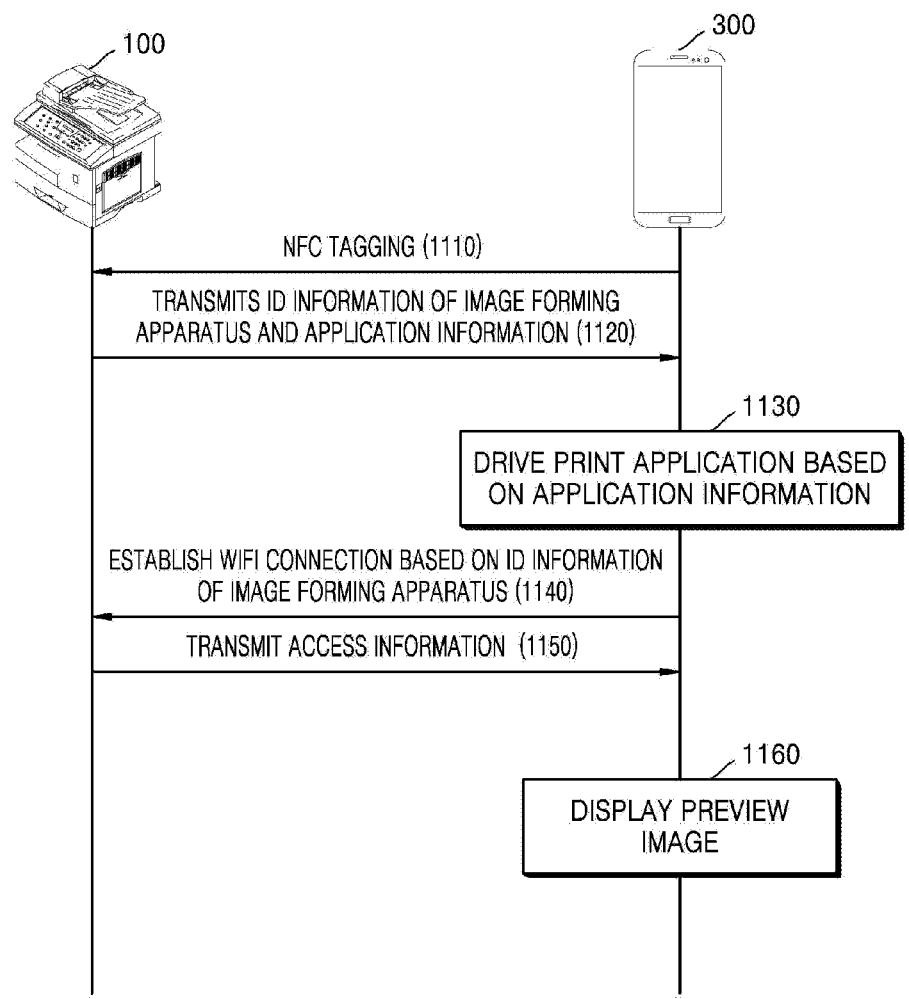
FIG. 11 is a diagram illustrating a process of exchanging data between an image forming apparatus and a mobile terminal, according to an exemplary embodiment.

FIG. 11 is a diagram illustrating a process of exchanging data between an image forming apparatus 100 and a mobile terminal 300, according to an exemplary embodiment.

In operation S1110, the image forming apparatus 100 tags the mobile terminal 300 through NFC. The image forming apparatus 100 may tag the mobile terminal 300 on an NFC tag of the image forming apparatus 100. The NFC tag may store unique information of the image forming apparatus 100, such as information regarding the performance of the image forming apparatus 100, a MAC address, an IP address, a mobile phone number, a personal ID number (PIN), etc. The mobile terminal 300 supporting the NFC function may read the information stored in the NFC tag when the mobile terminal 300 is tagged on the NFC tag.

In operation S1120, the image forming apparatus 100 transmits ID information thereof for establishing a wireless connection between the image forming apparatus 100 and the mobile terminal 300 according to a manner other than NFC, and application information for driving a print application to the mobile terminal 300

In operations S1130 and S1140, the mobile terminal 300 may automatically drive a print application supporting the image forming apparatus 100, based on the application information, and establish the wireless connection, e.g., a WiFi connection, between the image forming apparatus 100 and the mobile terminal 300 based on the ID information of the image forming apparatus 100. Also, the wireless connection established between the image forming apparatus 100 and the mobile terminal 300 may be any of various other types of wireless connection, and may be a peer-to-peer (P2P) connection between devices similar to WiFi Direct.

In operation S1150, the mobile terminal 300 may receive access information from the image forming apparatus 100 through the WiFi connection. Also, the mobile terminal 300 may receive user ID information mapped to the access information from the image forming apparatus 100 through the WiFi connection.

In operation S1160, the mobile terminal 300 displays a preview image of scan data. For example, the mobile terminal 300 may receive the preview image of the scan data based on the access information and the user ID information, and may display the preview image on the user interface of the mobile terminal 300.

Figure 12:
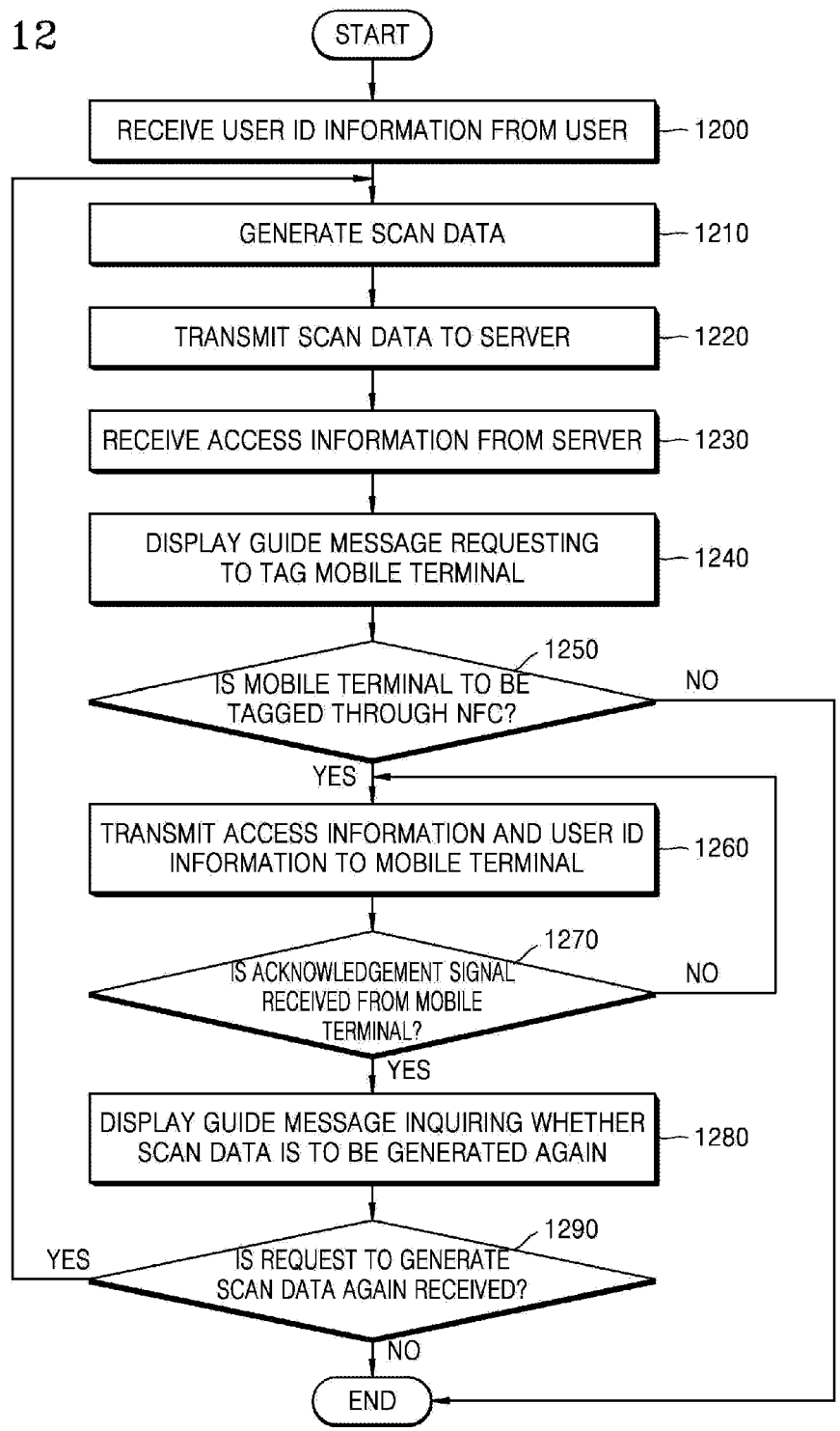
FIG. 12 is a flowchart of a method of providing a preview image of scan data, which is performed by an image forming apparatus, according to an exemplary embodiment.

FIG. 12 is a flowchart of a method of providing a preview image of scan data, which is performed by an image forming apparatus 100, according to an exemplary embodiment.

Referring to FIGS. 1 and 12, in operation S1200, the image forming apparatus 100 may receive user ID information from a user.

In operation S1210, when receiving a scan request from the user, the image forming apparatus 100 may generate scan data by scanning a document.

In operation S1220, the image forming apparatus 100 may transmit the scan data to the server 200 so as to store the scan data in the server 200.

In operation S1230, the image forming apparatus 100 may receive access information for accessing a preview image of the scan data from the server 200.

In operation S1240, the image forming apparatus 100 may display a guide message requesting to tag the mobile terminal 300 to provide the guide message to the user.

In operation S1250, the image forming apparatus 100 may determine whether the mobile terminal 300 is to be tagged through NFC. For example, when receiving a job end request via the user interface of the image forming apparatus 100, the image forming apparatus 100 may determine that the mobile terminal 300 is not to be tagged and end a job.

Also, when the mobile terminal 300 is not tagged within a predetermined time, the image forming apparatus 100 may determine that the mobile terminal 300 is not tagged via NFC and end the job. For example, when the mobile terminal 300 is not tagged within sixty seconds after the guide message requesting to tag the mobile terminal 300 is provided, the image forming apparatus 100 may determine that the mobile terminal 300 is not tagged and end the job.

In operation S1260, when it is determined that the mobile terminal 300 is tagged through NFC, the image forming apparatus 100 may transmit the access information to the mobile terminal 300. The image forming apparatus 100 may map the access information to the user ID information and transmit the access information to the mobile terminal 300. Also, the image forming apparatus 100 may transmit application information to the mobile terminal 300.

In operation S1270, the image forming apparatus 100 may determine whether an acknowledgement signal indicating that the transmission of the access information to the mobile terminal 300 is completed is received from the mobile terminal 300. For example, the image forming apparatus 100 may determine that the acknowledgement signal is not received when the acknowledgement signal is not received from the mobile terminal 300 within a predetermined time after the access information is transmitted to the mobile terminal 300.

When the acknowledgement signal is not received from the mobile terminal 300 within ten seconds after the access information is transmitted to the mobile terminal 300, the image forming apparatus 100 may determine that the acknowledgement signal is not received and transmit the access information again to the mobile terminal 300.

In operation S1280, the image forming apparatus 100 may display a guide message inquiring whether scan data is to be generated again.

In operation S1290, the image forming apparatus 100 may determine whether a request to generate scan data again is received. The image forming apparatus 100 may receive the request to generate scan data again or a job end request from the user via the user interface of the image forming apparatus 100.

When the quest to generate scan data again is received, the image forming apparatus 100 may generate new scan data by scanning the document again. When scan data is generated again, the image forming apparatus 100 need not receive the user ID information again from the user, and may use the user ID information received when the previous scan data was generated. For example, the new scan data may be mapped to the user ID information and transmitted to the server 200.

When the job end request is received, the image forming apparatus 100 may determine that the request to generate scan data again is not received and end a job. When the job is ended, the image forming apparatus 100 may delete the user ID information and the access information.

Also, when the request to generate scan data again is not received within the predetermined time, the image forming apparatus 100 may determine that the request to generate scan data again is not received. For example, when the request to generate scan data again is not received within sixty seconds after the guide message inquiring whether scan data is to be generated again is provided, the image forming apparatus 100 may end the job.

Figure 13:
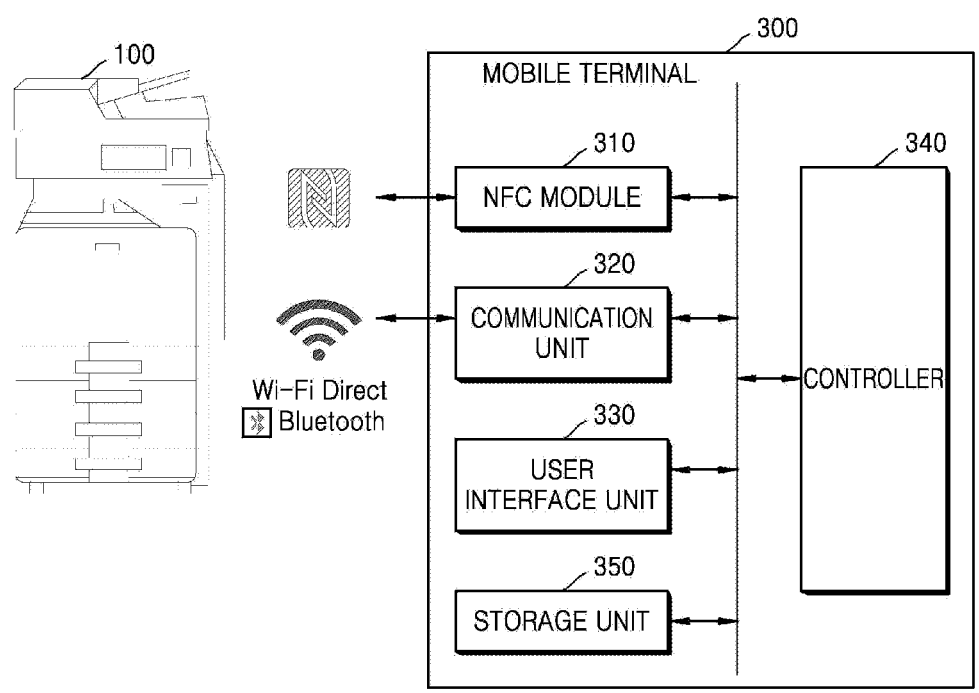
FIG. 13 is a block diagram of a structure of a mobile terminal supporting the NFC function according to an exemplary embodiment.

FIG. 13 is a block diagram of a structure of a mobile terminal 300 supporting the NFC function, according to an exemplary embodiment.

In the present exemplary embodiment of FIG. 13, only components of the mobile terminal 300 related to the present exemplary embodiment will be described so as not to obscure the features of the present exemplary embodiment. However, it would be obvious to those of ordinary skill in the art that the mobile terminal 300 may further include other general-purpose components.

The mobile terminal 300 according to the present exemplary embodiment includes an NFC module 310, a communication unit 320, a user interface unit 330, a controller 340, and a storage unit 350.

The NFC module 310 may perform the NFC function, read information from or write information to an NFC tag, and support link-level communication between two NFC devices. The NFC module 310 may communicate with a main board via a UART, an $I^2C$, an SPI bus, etc.

The NFC module 310 may receive or transmit information required to perform authentication for establishing a wireless connection between the mobile terminal 300 and an image forming apparatus 100 according to a manner other than NFC. For example, when the image forming apparatus 100 is tagged, the NFC module 310 of the mobile terminal 300 may receive ID information of the image forming apparatus 100 among information stored in the NFC tag of the image forming apparatus 100 beforehand.

The ID information of the image forming apparatus 100 is unique information of the image forming apparatus 100, and may be used to perform authentication for establishing the wireless connection between the image forming apparatus 100 and the mobile terminal 300 via a different manner other than NFC. For example, the ID information of the image forming apparatus 100 may include an MAC address, an IP address, and the like of the image forming apparatus 100.

The mobile terminal 300 may establish the wireless connection with the image forming apparatus 100 according to a different manner, based on the ID information of the image forming apparatus 100. Here, the different manner may be WiFi, WiFi Direct, Bluetooth, etc. The NFC module 310 according to the present exemplary embodiment may receive application information for driving a print application from the image forming apparatus 100.

The NFC module 310 may support link-level communication between the image forming apparatus 100 and the mobile terminal 300. When the image forming apparatus 100 is tagged, the NFC module 310 may receive access information, which is stored in the storage unit 150 of the image forming apparatus 100, in an NDEF message format. The NFC module 310 may receive access information stored in a dynamic NFC tag of the image forming apparatus 100 from the image forming apparatus 100. The image forming apparatus 100 may store access information, which is received from the server 200, in the dynamic NFC tag, and the NFC module 120 may transmit the access information stored in the dynamic NFC tag to the mobile terminal 300 when the mobile terminal 300 is tagged.

The communication unit 320 is configured to exchange data with external devices via wire/wired communication. The communication unit 320 may include a WiFi module, a WiFi Direct module, a Bluetooth module, etc.

The communication unit 320 may receive information required to perform authentication for establishing a wireless connection with the image forming apparatus 100 from the image forming apparatus 100 via the NFC module 310.

The communication unit 320 may receive the ID information of the image forming apparatus 100, which is used to perform the authentication, from the image forming apparatus 100, and establish the wireless connection with the image forming apparatus 100 based on the ID information of the image forming apparatus 100. The wireless connection may be established between the mobile terminal 300 and the image forming apparatus 100 via WiFi or Bluetooth.

The communication unit 320 may receive access information from the image forming apparatus 100 through the wireless connection established with the image forming apparatus 100. The communication unit 320 may further receive user ID information mapped to the access information.

The communication unit 320 may transmit an acknowledgement signal indicating that the receiving of the access information is completed to the image forming apparatus 100.

The communication unit 320 may access a location of scan data is stored in the server 200 based on the access information. For example, the communication unit 320 may access the server 200 corresponding to server ID information included in the access information, and log in to the server 200 based on the user ID information. Also, the communication unit 320 may access the location of the scan data stored in the server 200, based on location information included in the access information.

The communication unit 320 may receive a preview image of the scan data from the server 200 by using the access information.

The user interface unit 330 is configured to provide information to a user and receive a user input from the user, and may include a keyboard, an electrostatic/pressure-sensitive touch screen, physical buttons, etc.

The user interface unit 330 may display the preview image to provide the preview image to the user.

The controller 340 is configured to control overall operations of the image forming apparatus 100 and may include, for example, a CPU.

The controller 340 may drive a print application supporting the image forming apparatus 100, based on a received application address.

The controller 340 may determine whether access information is received from the image forming apparatus 100. When it is determined that access information is received from the image forming apparatus 100, the controller 340 may control the communication unit 320 to transmit an acknowledgement signal to the image forming apparatus 100.

The controller 340 may control the communication unit 320 to receive a preview image of the scan data from the server 200 based on the access information.

Figure 14:
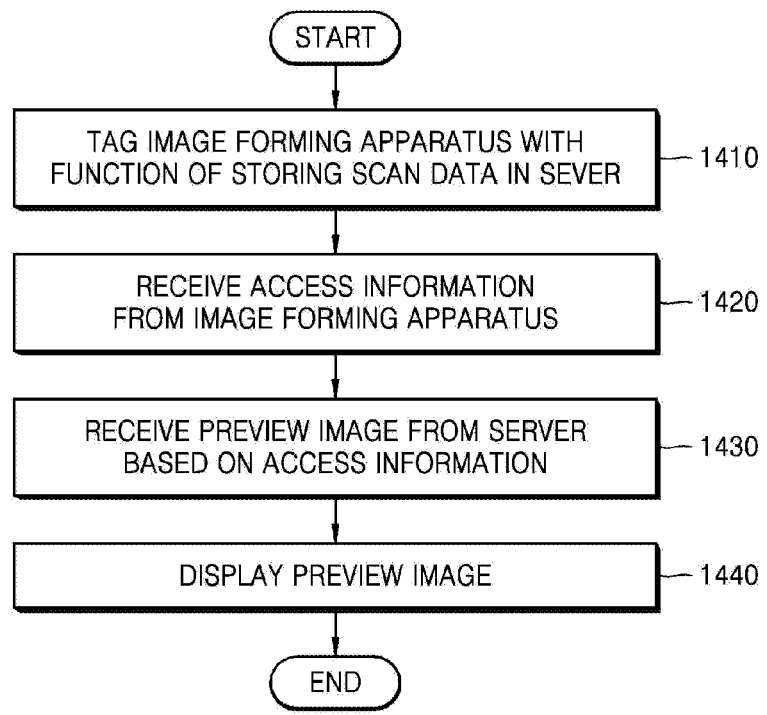
FIG. 14 is a flowchart of a method of previewing scan data on a mobile terminal, according to an exemplary embodiment.

FIG. 14 is a flowchart of a method of previewing scan data on a mobile terminal, according to an exemplary embodiment.

Referring to FIGS. 1 and 14, in operation S1410, the mobile terminal 300 tags the image forming apparatus 100 with a function of storing scan data in the sever 200, through NFC. When the image forming apparatus 100 is tagged, the mobile terminal 300 may receive application information from the image forming apparatus 100 and automatically drive a print application based on the application information.

Also, the mobile terminal 300 may receive ID information of the image forming apparatus 100 from the image forming apparatus 100 to establish a wireless connection with the image forming apparatus 100 according to a different manner other than NFC. For example, the mobile terminal 300 may perform authentication based on the ID information of the image forming apparatus 100, and establish the wireless connection with the image forming apparatus 100 when the authentication is completed.

In operation S1420, the mobile terminal 300 may receive access information from the image forming apparatus 100 through the wireless connection established with the image forming apparatus 100. For example, the mobile terminal 300 may receive access information including location information representing a location of scan data stored in the server 200 and server ID information. Also, the mobile terminal 300 may receive user ID information, which is mapped to the scan data, to be mapped to the access information.

In operation S1430, the mobile terminal 300 receives a preview image from the server 200 based on the access information. For example, the mobile terminal 300 may access the server 200 in which the scan data is stored, based on the server ID information included in the access information, and log in to the server based on the user ID information. Also, the mobile terminal 300 may access a location of the scan data stored in the server 200, based on the location information included in the access information, and receive a preview image of the scan data.

In operation S1440, the mobile terminal 300 displays the preview image.

FIG. 15 is a flowchart of a method of previewing scan data on a mobile terminal, according to an exemplary embodiment.

Referring to FIGS. 1 and 15, in operation S1505, the mobile terminal 300 tags the image forming apparatus 100 with a function of storing scan data in the sever 200, through NFC.

In operation S1510, the mobile terminal 300 may receive ID information of the image forming apparatus 100 and application information stored in an NFC tag of the image forming apparatus 100.

In operation S1515, the mobile terminal 300 may determine whether a print application corresponding to the application information is installed in the mobile terminal 300.

In operation S1520, when the print application is not installed, the mobile terminal 300 may install the print application by using the application information. For example, the mobile terminal 300 may download an installation file of the print application based on address information included in the application information, and install the print application by using the installation file.

In operation S1525, when the print application is installed, the mobile terminal 300 may drive the print application by using the application information. For example, the application information may include a drive command for automatically driving the print application.

In operation S1530, the mobile terminal 300 may determine whether a WiFi connection is established with the image forming apparatus 100. For example, the mobile terminal 300 may perform authentication for establishing the WiFi connection with the image forming apparatus 100 based on the ID information of the image forming apparatus 100, and establish the WiFi connection with the image forming apparatus 100 when the authentication is completed. When it is determined that the WiFi connection is not established with the image forming apparatus 100, the mobile terminal 300 may tag the image forming apparatus 100 again.

In operation S1535, when it is determined that the WiFi connection is established with the image forming apparatus 100, the mobile terminal 300 may receive access information and user ID information mapped to the access information through the WiFi connection. Also, the mobile terminal 300 may transmit an acknowledgement signal indicating that the receiving of the access information is completed to the image forming apparatus 100.

In operation S1540, the mobile terminal 300 may access the server 200 in which scan data is stored, based on server ID information included in the access information, and log in to the server 200 based on the user ID information.

In operation S1545, the mobile terminal 300 accesses a location of the scan data stored in the server 200 based on location information included in the access information. In operation S1550, the mobile terminal 300 may receive a preview image of the scan data by accessing the location of the scan data stored in the server 200.

In operation S1555, the mobile terminal 300 displays the preview image.

As described above, according to the one or more of the above exemplary embodiments, a preview image of scan data generated by an image forming apparatus may be displayed on a mobile terminal connected to the image forming apparatus through an NFC function, and a user may thus directly view a result of performing an image forming job, e.g., a scanning job. Also, even if the preview image cannot be displayed on a display screen of the image forming apparatus, the image forming apparatus may rapidly view the preview image by using the mobile terminal connected to the image forming apparatus through the NFC function.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. An image forming apparatus comprising:
   a scanner to generate scan data by scanning a document;
   a transceiver to:
      transmit the scan data to a server, and
      receive access information for accessing a preview image of the scan data stored in the server from the server;
   a near-field communication (NFC) transceiver to
      tag a mobile terminal on which the preview image is to be displayed through NFC, and
      transmit the access information for accessing the preview image of the scan data stored in the server when the mobile terminal tags an NFC tag of the image forming apparatus; and
   at least one processor.

2. The image forming apparatus of claim 1, wherein the access information comprises:
   identification (ID) information of the server; and
   location information representing a location of the scan data stored in the server.

3. The image forming apparatus of claim 2, wherein the access information comprises a uniform resource locator (URL) representing the server ID information and the location information.

4. The image forming apparatus of claim 1, further comprising a touch screen to receive user identification (ID) information for accessing the server,
   wherein the access information comprises the location information of the scan data mapped to the user ID information.

5. The image forming apparatus of claim 1, wherein the transceiver:
   maps user identification (ID) information for accessing the server to the scan data, and
   transmits the user ID information to the server.

6. The image forming apparatus of claim 1, wherein, when the mobile terminal is tagged, the NFC transceiver transmits, to the mobile terminal, application information for executing a print application in the mobile terminal.

7. The image forming apparatus of claim 1,
   wherein the NFC transceiver receives, from the mobile terminal, an acknowledgement signal indicating that the transmission of the access information to the mobile terminal is completed, and
   wherein the image forming apparatus further comprises a touch screen to provide a guide message inquiring whether scan data is to be generated again when the acknowledgement signal is received.

8. The image forming apparatus of claim 7,
   wherein, when a request to generate scan data again is received, the scanner generates new scan data, and
   wherein the transceiver:
      maps the new scan data to user ID information received via the touch screen, and
      transmits the new scan data to the server.

9. A mobile terminal supporting near-field communication (NFC), the mobile terminal comprising:
   an NFC transceiver to:
      tag an image forming apparatus which stores scan data in a server, and receive access information for accessing a preview image of the scan data stored in the server when the mobile terminal tags an NFC tag of the image forming apparatus;

a transceiver to:
    transmit the access information for accessing the preview image of the scan data stored in the server to the server, and
    receive the preview image from the server based on the access information; and
a touch screen to display the preview image.

10. The mobile terminal of claim 9, wherein the access information comprises:
    identification (ID) information of the server; and
    location information representing a location of the scan data stored in the server.

11. The mobile terminal of claim 9,
    wherein the transceiver receives user ID information mapped to the scan data and used to access the server from the image forming apparatus, and
    wherein the access information comprises location information of the scan data mapped to the user ID information.

12. The mobile terminal of claim 9, wherein the transceiver:
    accesses the server based on ID information of the server and user ID information for accessing the server, and
    receives the preview image of the scan data based on location information representing a location of the scan data stored in the server.

13. The mobile terminal of claim 9,
    wherein the NFC transceiver receives, from the image forming apparatus, application information for executing a print application in the mobile terminal when the image forming apparatus is tagged, and
    wherein the mobile terminal further comprises at least one processor to control the print application to be executed using the application information.

14. A method of providing a preview image of scan data of an image forming apparatus, the method comprising:
    generating the scan data by scanning a document;
    transmitting the scan data to a server;
    receiving, from the server, access information for accessing the preview image of the scan data stored in the server;
    tagging a mobile terminal on which the preview image is to be displayed through near-field communication (NFC); and
    transmitting, through NFC, the access information to the tagged mobile terminal when the mobile terminal tags an NFC tag of the image forming apparatus.

15. The method of claim 14, wherein the access information comprises:
    identification (ID) information of the server; and
    location information representing a location of the scan data stored in the server.

16. The method of claim 14, further comprising:
    receiving user identification (ID) information for accessing the server via a touch screen,
    wherein the transmitting of the scan data to the server comprises mapping the user ID information to the scan data and transmitting the user ID information to the server.

17. The method of claim 14, further comprising:
    receiving, from the mobile terminal, an acknowledgement signal indicating that the transmission of the access information to the mobile terminal is completed; and
    when the acknowledgement signal is received, providing a guide message inquiring whether scan data is to be generated again.

18. A method of previewing scan data of an image forming apparatus on a mobile terminal, the method comprising:
    tagging the image forming apparatus that stores the scan data in a server;
    receiving, from the image forming apparatus through near field communication (NFC), access information for accessing a preview image of the scan data stored in the server when the mobile terminal tags an NFC tag of the image forming apparatus;
    receiving the preview image from the server, based on the access information; and
    displaying the preview image.

19. The method of claim 18, wherein the receiving of the preview image from the server comprises:
    accessing the server, based on identification (ID) information of the server and user ID information for accessing the server; and
    receiving the preview image of the scan data, based on location information representing a location of the scan data stored in the server.

20. A non-transitory computer readable storage medium storing computer readable instructions that, when executed, cause at least one processor to perform the method of claim 14.

21. A non-transitory computer readable storage medium storing computer readable instructions that, when executed, cause at least one processor to perform the method of claim 18.

* * * * *